(12) United States Patent
Ogata

(10) Patent No.: US 7,747,337 B2
(45) Date of Patent: Jun. 29, 2010

(54) APPARATUS AND METHOD FOR MANAGING AUDIO DATA AND RECORDING APPARATUS

(75) Inventor: Kiyoshi Ogata, Tokyo (JP)

(73) Assignee: Sony Corporation (JP)

( * ) Notice: Subject to any disclaimer, the term of this patent is extended or adjusted under 35 U.S.C. 154(b) by 1236 days.

(21) Appl. No.: 10/275,517

(22) PCT Filed: Mar. 15, 2002

(86) PCT No.: PCT/JP02/02503

§ 371 (c)(1),
(2), (4) Date: Nov. 6, 2002

(87) PCT Pub. No.: WO02/075740

PCT Pub. Date: Sep. 26, 2002

(65) Prior Publication Data

US 2003/0149497 A1 Aug. 7, 2003

(30) Foreign Application Priority Data

Mar. 15, 2001 (JP) .............................. 2001-74680

(51) Int. Cl.
*G06F 17/00* (2006.01)
(52) U.S. Cl. ...................................... 700/94
(58) Field of Classification Search ................... 700/94; 709/227, 208, 213; 369/1, 2, 6, 11
See application file for complete search history.

(56) References Cited

U.S. PATENT DOCUMENTS

| | | | |
|---|---|---|---|
| 6,332,175 B1 * | 12/2001 | Birrell et al. | 711/112 |
| 6,581,075 B1 * | 6/2003 | Guturu et al. | 707/201 |
| 6,694,200 B1 * | 2/2004 | Naim | 700/94 |
| 2005/0240297 A1 * | 10/2005 | Scotzin et al. | 700/94 |

FOREIGN PATENT DOCUMENTS

| | | |
|---|---|---|
| JP | 4-159662 A | 6/1992 |
| JP | 11-328929 A | 11/1999 |
| JP | 2000-200475 A | 7/2000 |
| JP | 2000-260168 A | 9/2000 |
| JP | 2001-006260 A | 1/2001 |

* cited by examiner

*Primary Examiner*—Andrew C Flanders
(74) *Attorney, Agent, or Firm*—Lerner, David, Littenberg, Krumholz & Mentlik, LLP

(57) ABSTRACT

An audio playback apparatus that reproduces audio data stored in the form of an electronic file includes a hard disc drive for storing audio data and management data for managing the audio data; an external interface section for outputting the management data read from the hard disc drive, to an external editing apparatus and for receiving the management data edited by the external editing apparatus; and a control section for rewriting the management data stored in the hard disc drive to the management data edited by the external editing apparatus. By using the external editing apparatus to edit additional information for managing the audio data stored in the hard disc drive of large capacity, the labor in editing additional information can be saved.

17 Claims, 6 Drawing Sheets

APPARATUS AND METHOD FOR MANAGING AUDIO DATA AND RECORDING APPARATUS

TECHNICAL FIELD

The present invention relates to a recording apparatus, a system for managing audio data in a recording apparatus of large storage capacity, a method of managing recorded data, and the like.

BACKGROUND ART

One of the methods of recording music data is to record the music data recorded on a CD (Compact Disc) or the like, into a recording apparatus of large storage capacity, such as a hard disc drive, which can easily record additional data and easily rewrite data. Recording apparatuses having hard discs can be incorporated in to audio systems for use in cars. The car audio system is not user-friendly in that it is difficult for the user to replace the recording medium, such as a CD, with another while driving the car. However, if a hard disc is incorporated into the car audio system and music data are recorded on the hard disc and managed, the user can save time for exchanging the recording media.

The music data recorded on a recording apparatus of large storage capacity can be reproduced by means of car audio systems. The display device of the car audio system shows information, such as the titles of musical works, managed in any car audio system. The user can select any desired one of the musical works, the information about which is shown by the display device, and can thereby have the selected work reproduced.

The display device of the car audio system will be described, with reference to FIG. 1. FIGS. 1A and 1B show a part of the display section that is mounted on a car audio system. FIG. 1A depicts the display section of the front panel 100 of the car audio system. As seen from FIG. 1A, the display device 101 displays a list 102 of the musical works that are recorded in the large-capacity recording apparatus, such as a hard disc drive, incorporated in the car audio system. The information about the data file selected at present is reverse-displayed. In the instance illustrated in FIG. 1A, the data file selected is a music data file containing the information of "artist 2, title 2." The user may rotate the jog roller 103 in the direction of the arrow or in the opposite direction to select any other data file shown in the list 102. Thus, the user can have the music data reproduced.

In this car audio system, music data can be recorded on the hard disc from the CD and tuner (not shown) that is incorporated in the car audio system. The user can add information, e.g., the title and the like, to the music data recorded on the hard disc. The information thus added is recorded on the hard disc, too. A method of editing character data in the process of writing the additional information will be explained, with reference to FIG. 1B.

FIG. 1B is a diagram for explaining how the user operates the front panel 100 to edit the additional information. The display device 101 displays the information to be added, so that the user may edit the information. The user may rotate the jog roller 103 in the direction of the arrow shown in FIGS. 1A and 1B, or in the opposite direction to have any desired character data displayed. The user may push the jog roller 103 to select the character data displayed by the display device 101. The user can thus edit the character data displayed by the display device 101 and generate information to be added to the music data, such as the title of the music data. The additional information so generated can be recorded on the hard disc, along with the music data file. The display device 101 shows the additional information as a list 102.

Display devices for use in ordinary car audio systems, such as the one shown in FIGS. 1A and 1B, does not have a large display screen. Generally, audio systems do not have a large display screen. This is because the function of displaying information is nothing more than an additional one to any audio system whose main function is to reproduce audio data. Inevitably, the display screen is limited in terms of size. So is the amount of information about music data (e.g., the title, recording date and the like) that can be displayed on the screen. It is therefore difficult for the display device shown in FIGS. 1A and 1B to display various data items such as the recording date, together with the tile of the musical work.

As pointed out above, the display device incorporated in the car audio system displays the information added to the music data to be reproduced, such as the title of the musical work. And the user edits this information, while looking at the information displayed by the display device. With such a conventional audio system it becomes more difficult for the user to select a desired music data file as more and more music data files of similar names (i.e., the tiles of the musical works, added to the music data files) are recorded. To make it easy to distinguish the music data files, one from another, the user edits the additional information to change the tiles of the musical works or alter the order in which the musical works are recorded.

The display device mounted on such an audio system as described above has but a small screen and can display but a small amount of information. It is therefore hard for the user to edit information on the display screen. Since the display device has a small screen and can display but a limited amount of information, the user cannot easily know which directory holds which music data file. This is particularly so, if the music data is managed in the form of data files stored in a file system with a large-capacity recording apparatus such as a hard disc drive.

To edit the information to change the tiles of the musical works or alter the order in which the musical works are recorded, the user must manipulate the jog roller 103 shown in FIGS. 1A and 1B, thereby to edit the character data items, one by one. This requires much time and labor.

DISCLOSURE OF THE INVENTION

An object of this invention is to save labor in editing additional information that is used to manage the audio data recorded in a large-capacity recording apparatus, such as a hard disc drive, which is incorporated in an audio system.

To achieve the object, an audio playback apparatus according to this invention is designed to reproduce audio data stored in the form of an electronic file. The audio playback apparatus comprises: a data-rewritable recording medium for storing the computerized audio data and management data for managing the audio data; input/output means for supplying the management data read from the recording medium, to an external editing apparatus, and for receiving from the external editing apparatus the management data edited by the external editing apparatus; and management-data rewriting means for rewriting the management data stored in the recording medium to the management data edited and received by the input/output means.

In the audio playback apparatus according to this invention, data can be written on and read from the recording medium by magnetic means, and the recording medium is permanently incorporated in the audio playback apparatus, such as a hard disc drive. This means to have large storage capacity economically and easily.

The recording medium is the one in which the audio data and the management data are stored in the form of separate files. It is therefore easy to extract only the management data and transfer the same to the external editing apparatus.

The input/output means may comprise data-writing/reading means for writing and reading data into and from a removable recording medium into and from which the editing apparatus can write and read data. Hence, the management data can be supplied to the editing apparatus via the removable recording medium that excels in portability like a memory stick.

The audio playback apparatus according to this invention may further comprise editing means for editing the management data stored in the recording medium without using an external editing apparatus and for limiting the editing of the management data when the input/output means is unable to write or read data into or from the removable recording medium. In other words, the editing apparatus can edit the management data only while it is holding a removable recording medium such as a memory stick. This prevents the audio playback apparatus from editing the management data while the external editing apparatus is editing the management data, inevitably rendering it difficult to determine which management data should be used to manage the audio data.

The present invention also provides a data-processing apparatus. The data-processing apparatus comprises: a first recording medium storing prescribed content data; management means for managing the content data; and input means for inputting data supplied from a second recording medium that is removable. The management means manages the content data in accordance with management data for managing the content data, said management data stored in the second recording medium and input by the input means.

In the data-processing apparatus according to this invention, the first recording medium stores the content data and the management data regarding the content data, and the second recording medium stores management data generated by editing the management data read from the first recording medium.

Another aspect of this invention, which attains the object of the invention, is a method of managing audio data in an audio playback apparatus that reproduces audio data stored in the form of an electronic file. This method comprises: a step of storing the audio data and management data for managing the audio data, into a recording apparatus in which data can be rewritten; a step of reading the management data from the recording apparatus and supplying the management data to an external editing apparatus; a step of editing the management data in the external editing apparatus; a step of receiving the management data edited by the external editing apparatus; and a step of rewriting the management data stored in the recording apparatus to the management data edited by the external editing apparatus.

In the method, the step of rewriting the management data may include: a step of comparing the date of updating the management data stored in the recording apparatus with the date of updating the management data edited and combining the items of the management data which are the latest, thereby to generate a new management data; and a step of rewriting the management data stored in the recording apparatus to the new management data thus generated. In this case, the audio playback apparatus may edit the management data, while the external editing apparatus is editing the management data, and the results of both editing processes may be reflected in each management data items, namely each audio data item.

Still another aspect of the invention is a method of managing content data in a playback apparatus that reads and reproduces prescribed content data from a recording medium which stores the prescribed content data and management data for managing the content data. In the method, the management data is read and output from the recording medium to an external editing apparatus, the management data is edited in the editing apparatus, the management data edited in the editing apparatus is received, the content data is managed by using the management data received, instead of the management data stored in the recording medium.

The other objects of this invention and the other advantages achieved by the invention will be apparent from the embodiments that shall be described below, with reference to the accompanying drawings.

BEST MODE FOR CARRYING OUT THE INVENTION

An embodiment of the present invention will be described in detail, with reference to the accompanying drawings.

Figure 1A:
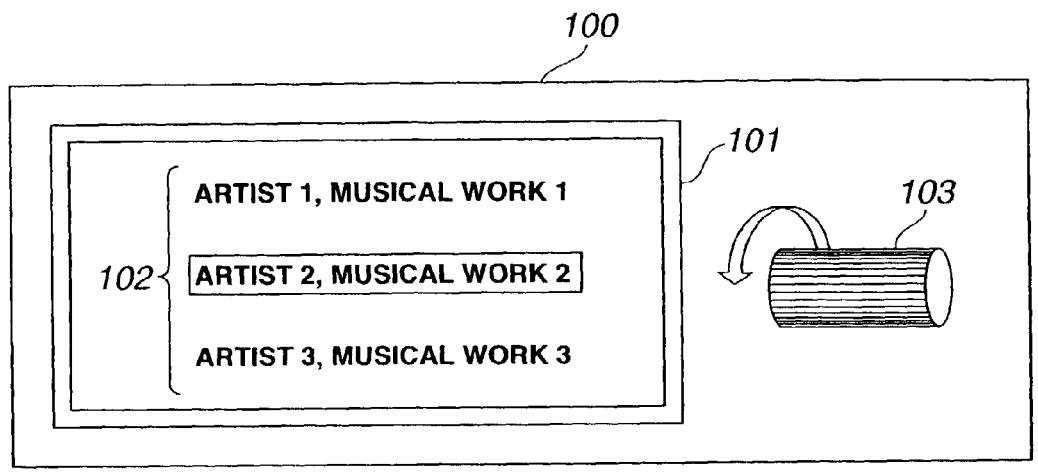
FIG. 1A is a diagram showing the front panel of a car audio system.
Figure 1B:
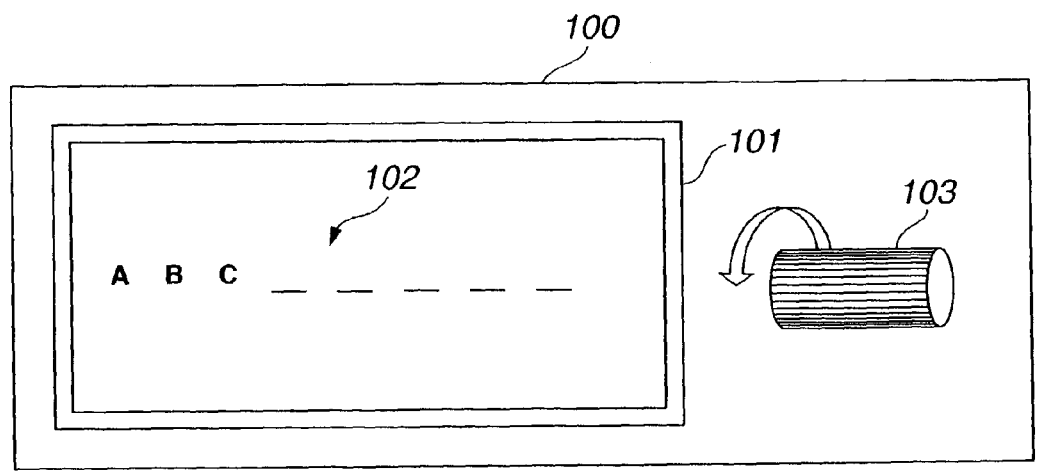
FIG. 1B is a diagram for explaining how additional information is edited at the front panel.
Figure 2:
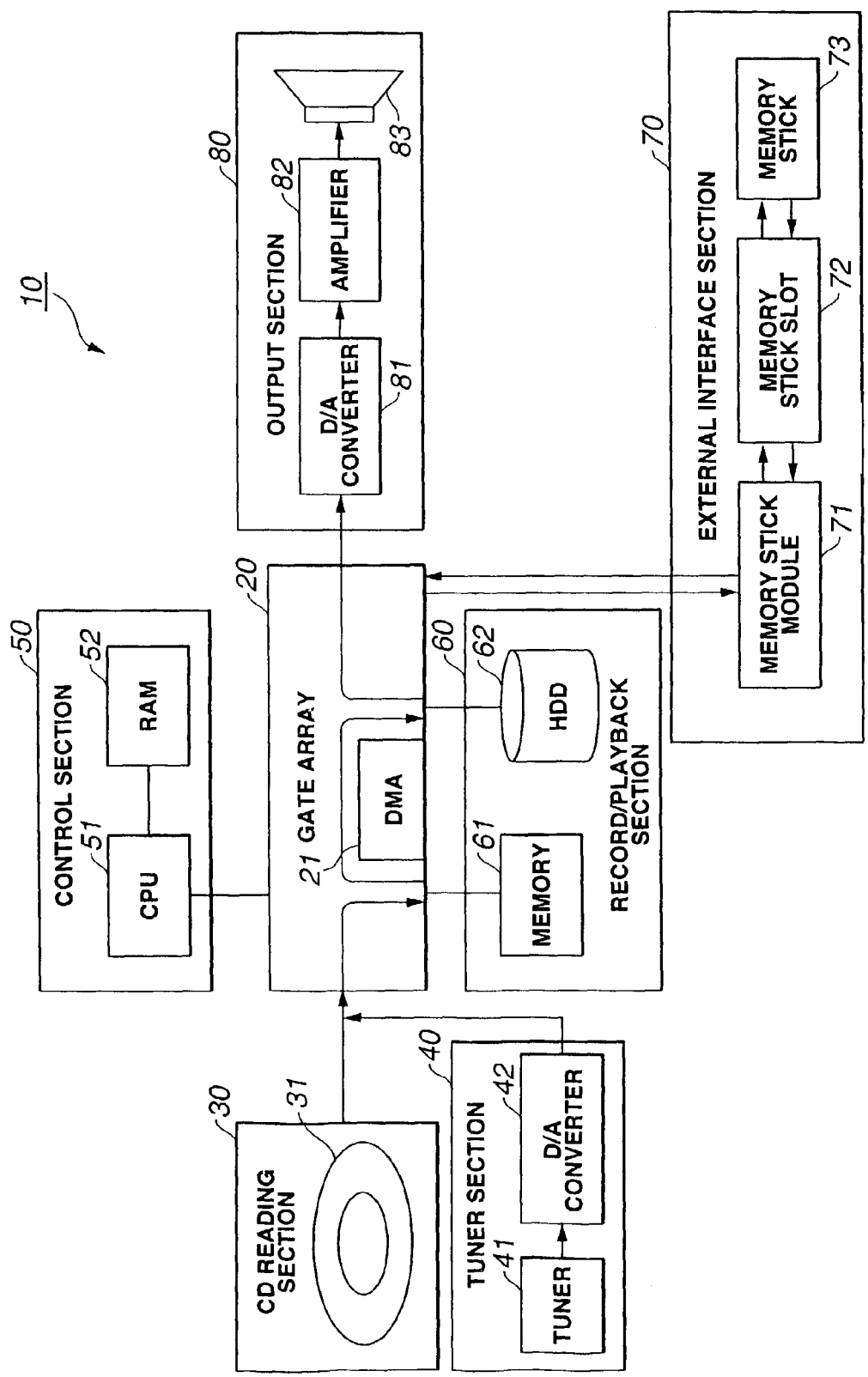
FIG. 2 is a block diagram illustrating a recording/reproducing apparatus to which the present invention is applied.

A record/playback apparatus 10 according to the present invention has the system configuration shown in FIG. 2. This embodiment, i.e., record/playback apparatus 10, is an audio system incorporating a hard disc drive that is used as large-capacity recording apparatus for recording. As FIG. 2 depicts, the apparatus 10 comprises a gate array 20, a CD reading section 30, a tuner section 40, a control section 50, a record/playback section 60, an external interface section 70, and an output section 80.

The gate array 20 functions as interface between the modules such as the CD reading section 30, the tuner section 40, the record/playback section 60 and the like. The gate array 20 comprises logic circuits that cause the modules to perform processes. The gate array 20 incorporates a DMA controller 21 ("DMA" in FIG. 2). The DMA 21 directly controls the transfer of data to and from the record/playback section 60.

The CD reading section 30 holds a CD 31 on which music data has been recorded. The section 30 has an optical pickup, which can read the music data. The CD reading section 30 is, for example, a CD player of the known type. Alternatively, the CD reading section 30 may be a DVD (Digital Versatile Disc)-audio player, an MD player or the like, which can reproduce digital music data from data sources. In the embodiment, a DVD or an MD (Mini Disc) is used as the medium for recording music data. The section 30 may be replaced by a digital reproducing apparatus provided outside the record/playback apparatus 10 and connected to the apparatus 10 by a cable or the like.

The tuner section 40 comprises a tuner 41 and an A/D (Analog-to-Digital) converter 42. The tuner 41 is a receiver that receives radio waves of a limited band, such as AM waves and FM waves. The A/D converter 42 has the function of converting analog data to digital data. The A/D converter 42 receives the analog data that the tuner 41 has received and converts this data to audio data that is digital data. The music data read by the CD reading section 30 and the audio data that is converted to digital data by the A/D converter 42 are sent to the gate array 20.

The control section 50 is a system control section that controls any other component of the record/playback apparatus 10, including the gate array 20. The section 50 comprises a CPU 51 and a RAM 52. The CPU 51 is the central processing unit. The RAM 52 is the main memory into and from which the CPU 51 can write and read data directly. The RAM 52 can store and hold the firmware and the like of the record/playback apparatus 10. The CPU 51 reads the firmware held in the RAM 52, interprets it and executes it. The CPU 51 activates the various functions of the record/playback apparatus 10, in accordance with the commands supplied from the device (not shown) that the user operates.

The record/playback section 60 comprises a memory 61 and a hard disc drive (HDD) 62. In the record/playback section 60, the audio data supplied from the CD reading section 30 or the tuner section 40 via the gate array 20 is recorded into the hard disc drive 62, i.e., a large-capacity recording apparatus. The memory 61 is a storage device that temporarily holds the audio data sent from the gate array 20. The hard disc drive 62 records the audio data held in the memory 61. The audio data recorded in the hard disc drive 62 is sent to the output section 80 through the gate array 20 and can be reproduced.

The audio data read by the CD reading section 30 and output from the tuner section 40 is supplied to the memory 61 via the gate array 20. The memory 61 temporarily stores the audio data. The DMA controller 21 incorporated in the gate array 20 sends the audio data, one item after another, to the hard disc drive 62 and recorded therein. The method in which the hard disc drive 62 records the audio data will be explained later in detail.

The scheme of recording the audio data sent to the hard disc drive 62 in the form of digital data will be described below.

When the audio data is recorded in the hard disc drive 62, the music data, i.e., content data, and the TOC (Table Of Contents) information are recorded separately. Note that the TOC information is management data for managing the music data. The TOC information 63 is additional data that represents the titles of musical works, the order in which the works have been recorded, the dates of recording the musical works, the time of each work recorded, the positions of disc sectors in which the musical works, i.e., the contents, are recorded, and the like. The TOC information can be edited later. Thus, the TOC information 63 is recorded, independently of the music data. Hence, it is possible to extract only the TOC information 63 and edit the same. If the TOC information 63 is edited, any desired music work can be reproduced from the hard disc drive 62, merely by selecting the title of the musical work. This is because the items of the music data are associated with the items of the TOC information 63, respectively.

The output section 80 comprises a D/A (Digital-to-Analog) converter 81, an amplifier 82, and a loud speaker 83. The D/A converter 81 receives digital data from the gate array 20 and converts this data to analog data. The amplifier 82 amplifies the analog data generated by the D/A converter 81. The analog data amplified is supplied to the loud speaker 83. The speaker 83 receives the analog data and generates a speech from the analog data.

The external interface section 70 comprises a memory stick module 71, a memory stick slot 72, and a memory stick 73. The memory stick module 71 is a module designed to connect the gate array 20 to the memory stick slot 72. The memory stick module 71 sends the TOC information 63 stored in the hard disc drive 62, to the memory stick slot 72 through the gate array 20. The module 71 also supply the TOC information 63 sent from the memory stick slot 72, to the hard disc drive 62 through the gate array 20. The memory stick slot 72 is a device that holds the memory stick 73 that is a recording medium. The slot 72 can write and read data into and from the memory stick 73.

This embodiment uses the memory stick 73 as a recording medium that serves to extract the TOC information 63. Any other type of a recording medium may be used, only if data can be written and read into and from this medium and if any means is provided that can connect the recording medium to the gate array 20. For example, the memory stick 73, memory stick slot 72 and memory stick module 71 may be replaced by a removable medium such as a smart medium or a floppy disc and a device for driving the removable medium. Alternatively, no recording medium whatever may be used; the gate array 20 may be connected by a cable or the like to a computer to read the TOC information 63 from the computer.

Of the digital data recorded in the hard disc drive 62 (i.e., TOC information and music data), only the TOC information 63 is extracted to enable external editing apparatuses to edit the TOC information 63.

The record/playback apparatus 10 has a data-editing function and a system (not shown) for editing the TOC information 63. The data-editing function is similar to that of the conventional apparatus. Thus, the apparatus 10 can edit the TOC information 63, not depending on any external editing apparatus. Hence, the record/playback apparatus 10 can automatically edit the TOC information 63. Otherwise, the apparatus 10 can edit the TOC information 63 when operated by the user in the same manner as the conventional apparatus is operated.

A method of editing the TOC information 63 read from the hard disc drive 62 will be described in more detail, with reference to FIG. 3.

Figure 3:
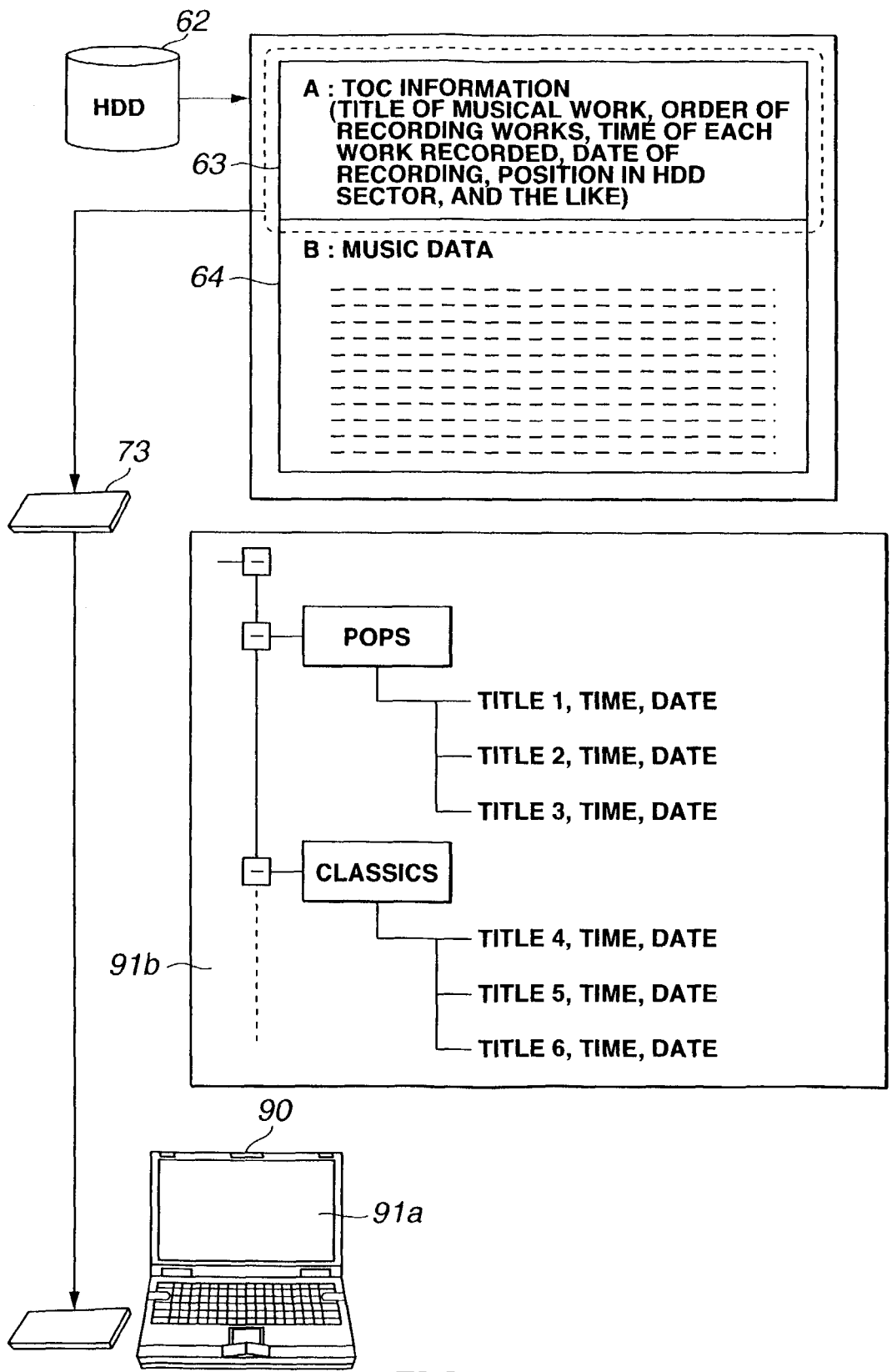
FIG. 3 is a diagram explaining a method of editing TOC information.

FIG. 3 shows a general-purpose personal computer 90 that serves as an external editing apparatus for editing the TOC information 63 in the present embodiment of the invention. The personal computer 90 may be a desktop computer, a notebook-type computer, or any other type of a personal computer. Assume that the record/playback apparatus 10 is a car audio system. In this case, it is desired that the notebook-type computer, which is portable, be used to edit the TOC information 63 in the car that has the apparatus 10 is installed.

As FIG. 3 depicts, the hard disc drive 62 of the record/playback apparatus 10 stores the TOC information 63 and the music data 64 in the form of separate data files. In this embodiment of the invention, of the data recorded in the hard disc drive 62, the TOC information 63 is read out and written into the memory stick 73. The TOC information 63 recorded in the hard disc drive 62 is sent to the memory stick slot 72 via the gate array 20 and memory stick module 71. In the memory stick slot 72, the TOC information 63 is written into the memory stick 73.

The personal computer 90, i.e., the editing apparatus, reads the TOC information 63 from the memory stick 73. The personal computer 90 has a memory stick slot (not shown) that is a device for reading the TOC information 63 from the memory stick 73.

Assume that a data-editing program has been installed into the personal computer 90, which is described to read the TOC information 63 from the memory stick 73, interpret the TOC information 63 and display the TOC information 36 on the display section 91a of the personal computer 90. The data-editing program works in accordance with the instructions the user inputs. That is, the program edits the TOC information 63 as the user operates an input device, such as the keyboard, while looking at the TOC information 63 displayed on the display section 91a. The screen of the display section 91a is large enough to display the TOC information 63 at a time. The section 91a can therefore display a list of far more TOC information items than the display section of the record/playback apparatus 10. Seeing the list displayed, the user can easily understand the entire TOC information 63. This helps him or her to edit TOC information 63 with ease.

An example 91b of a display screen for the TOC information 63 is shown, which the display section 91a displays in accordance with the program installed in the personal computer 90. Displayed on the display screen 91b are directories of various genres of music, including pops, classics and the like. Registered in the directory are various data items such as the titles of musical works recorded, the lengths of musical works recorded, and the dates of recording the musical works.

The personal computer 90, i.e., the editing apparatus, has an input devices such as a keyboard and a mouse that the user may operate to edit the information displayed on the display screen 91b. The user operates the input devices, processing the TOC information 63 displayed on the display screen 91b. The directories of some genres can thereby be deleted, and new directories of genres can thereby be generated. The user may change the titles of musical works to new distinct ones, on the basis of data items such as the date of recording. The new titles enable the user to distinguish the musical works from the others.

The data-editing program installed in the personal computer 90 includes the function of writing the TOC information 63 into the memory stick 73 after the information 63 has been edited. When the computer 90 performs this function, the TOC information 63 edited on the display screen 91b is written into the memory stick 73. The memory stick 73 now holding the TOC information 63 edited is removed from the computer 90 and inserted into the memory stick slot 72 of the record/playback apparatus 10. The TOC information 63 that the personal computer 90 has written is read from the memory stick 73 and supplied to the hard disc drive 62 through the gate array 20.

It will now be explained how to manage the version data about the TOC information 63.

As indicated above, the personal computer 90, i.e., the editing apparatus, can edits the TOC information 63 read from the hard disc drive 62 provided in the record/playback apparatus 10 and thence stored into the memory stick 73. Alternatively, the operation system of the record/playback apparatus 10 may be used to edit the TOC information 63. In this case, the TOC information 63 stored in the hard disc drive 62 must be compared with the TOC information 63 written in the memory stick 73 when the memory stick 73 is inserted into the memory stick slot 72. In principle, the TOC information 63 updated most recently (i.e., the information updated last) is used.

Figure 5:
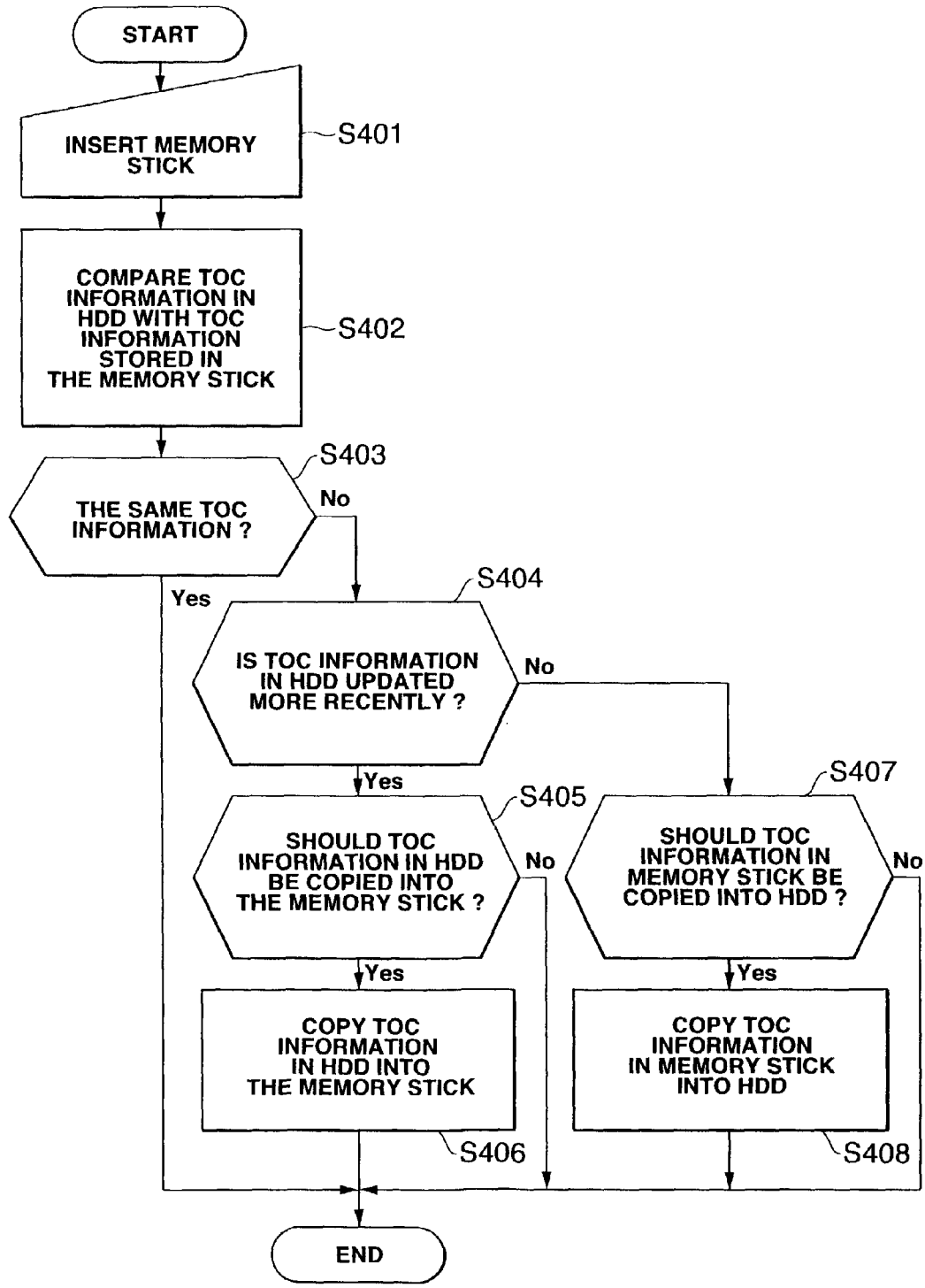
FIG. 5 is a flowchart explaining the process of managing the version data about the TOC information.

FIG. 5 is a flowchart that explains the process of managing the version data about the TOC information 63.

As seen from FIG. 5, the memory stick 73 is inserted into the memory stick slot 72 of the record/playback apparatus 10 (Step 401). Then, the TOC information 63 written in the memory stick 73 is compared with the TOC information 63 recorded in the hard disc drive 62 (Step 402). It is determined whether the TOC information items compared are identical or not (Step 403). If YES, the process is terminated.

If the TOC information 63 written in the memory stick 73 differs from the TOC information 63 recorded in the hard disc drive 62, the dates of updating these TOC information items are compared (Steps 403 and 404). If the TOC information 63 stored in the hard disc drive 62 has been updated more lately, it is copied in the memory stick 73, over-written therein (Steps 405 and 406).

On the other hand, the TOC information 63 written in the memory stick 73 may be updated more lately, it is over-written in the hard disc drive 62 (Steps 407 and 408).

Assume that some music data is added or deleted in the record/playback apparatus 10 while the personal computer 90 is editing the TOC information 63, and that the TOC information 63 is edited also in the record/playback apparatus 10. If this is the case, a trouble may arise if the TOC information 63 updated latest is applied. How a trouble occurs will be explained in detail, with reference to FIG. 3.

Figure 4:
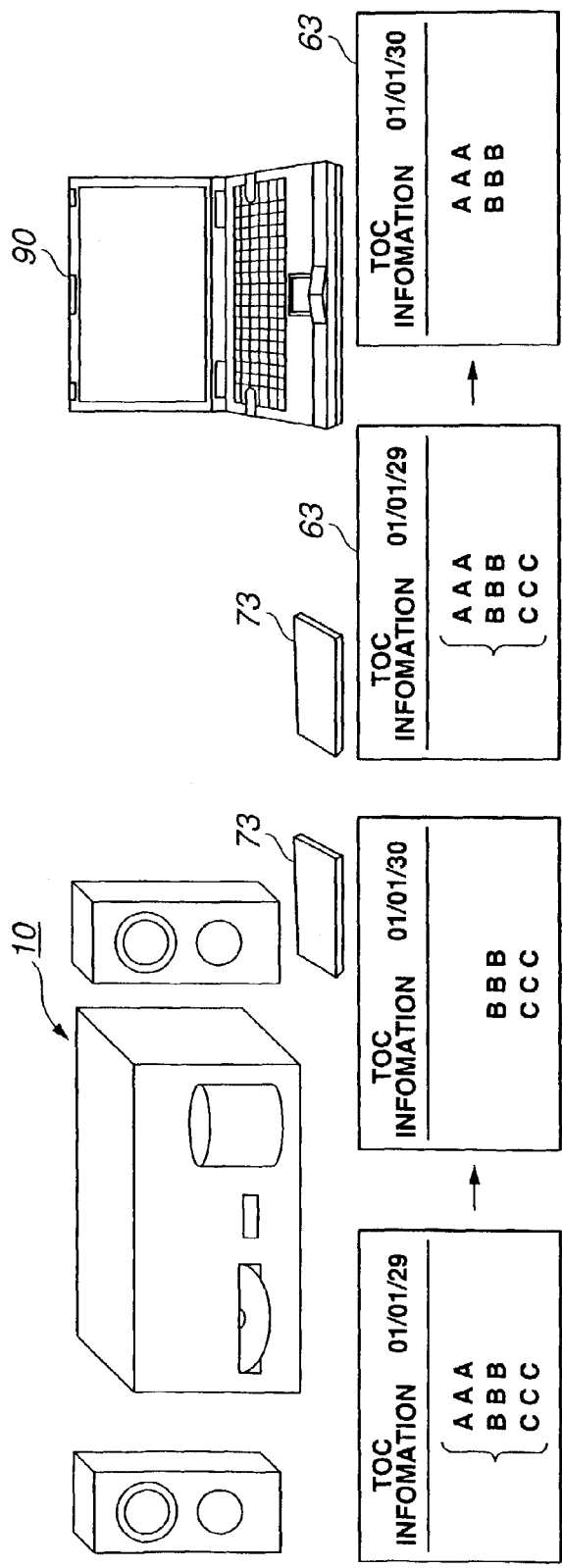
FIGS. 4A to 4C are diagrams that explain how a trouble occurs when the TOC information is edited.

FIG. 4A is a diagram illustrating the contents represented by the TOC information 63 that is stored in the hard disc drive 62 of the record/playback apparatus 10. As FIG. 4A depicts, the TOC information valid as of Jan. 29, 2001 represents a list showing three musical works AAA, BBB and CCC. Suppose this TOC information 63 is written into the memory stick 73. Thereafter, on Jan. 30, 2001, the data of musical work AAA may be deleted from the list represented by the TOC information 63, in the record/playback apparatus 10.

FIG. 4B is a diagram showing the contents represented by the TOC information 63 that is stored in the hard disc drive 62 of the record/playback apparatus 10, before and after the personal computer 90 edits the TOC information 63 written in the memory stick 73.

The TOC information 63 written into the memory stick 73 on Jan. 29, 2001 represents a list of three musical works AAA, BBB and CCC. Assume that this list represented by the TOC information 63 is read into the personal computer 90 and that musical work CCC is deleted from the list on Jan. 30, 2001 and written into the memory stick 73.

FIG. 4C is a diagram explaining how to record TOC information (not shown) back into the record/playback apparatus 10 from the personal computer 90 by using the memory stick 73.

Note that the TOC information 63 recorded in the hard disc drive 62 represents the list from which musical work AAA was deleted on Jan. 30, 2001, and which therefore contains only musical works BBB and CCC. On the other hand, the TOC information 63 edited in the personal computer 90 and written in the memory stick 73 represents the list from which musical work CCC was deleted on Jan. 30, 2001, and which therefore contains only musical works AAA and BBB.

In this instance, which TOC information 63 has been updated more recently than the other can be determined by comparing the time when one TOC information was updated with the time when the other TOC information was updated. However, a trouble will occur, no matter whichever TOC information is applied. If the TOC information 63 written in the memory stick 73 is used, the musical work AAA will revive in the TOC information 63, though it has been deleted in the hard disc drive 62. If the TOC information 63 stored in the hard disc drive 62 is used, the musical work AAA deleted when the personal computer 90 edited the TOC information will revive. Some measures should be taken to avoid this trouble that occurs in either case.

One of such measures is to control the hardware so that the TOC information 63 may be rewritten by operating the operation system of the record/playback apparatus 10 only while the memory stick 73 remains inserted in the memory stick slot 72 of the record/playback apparatus 10. This measure taken, the TOC information 63 held in the hard disc drive 62 of the record/playback apparatus 10 would not be rewritten while the personal computer 90 is editing the TOC information 63 written in the memory stick 73.

Another measure that should be taken to avoid the above-mentioned trouble is to record the history of edition of the TOC information 63 and to combine the latest TOC information items into a new TOC information 63.

Figure 6:
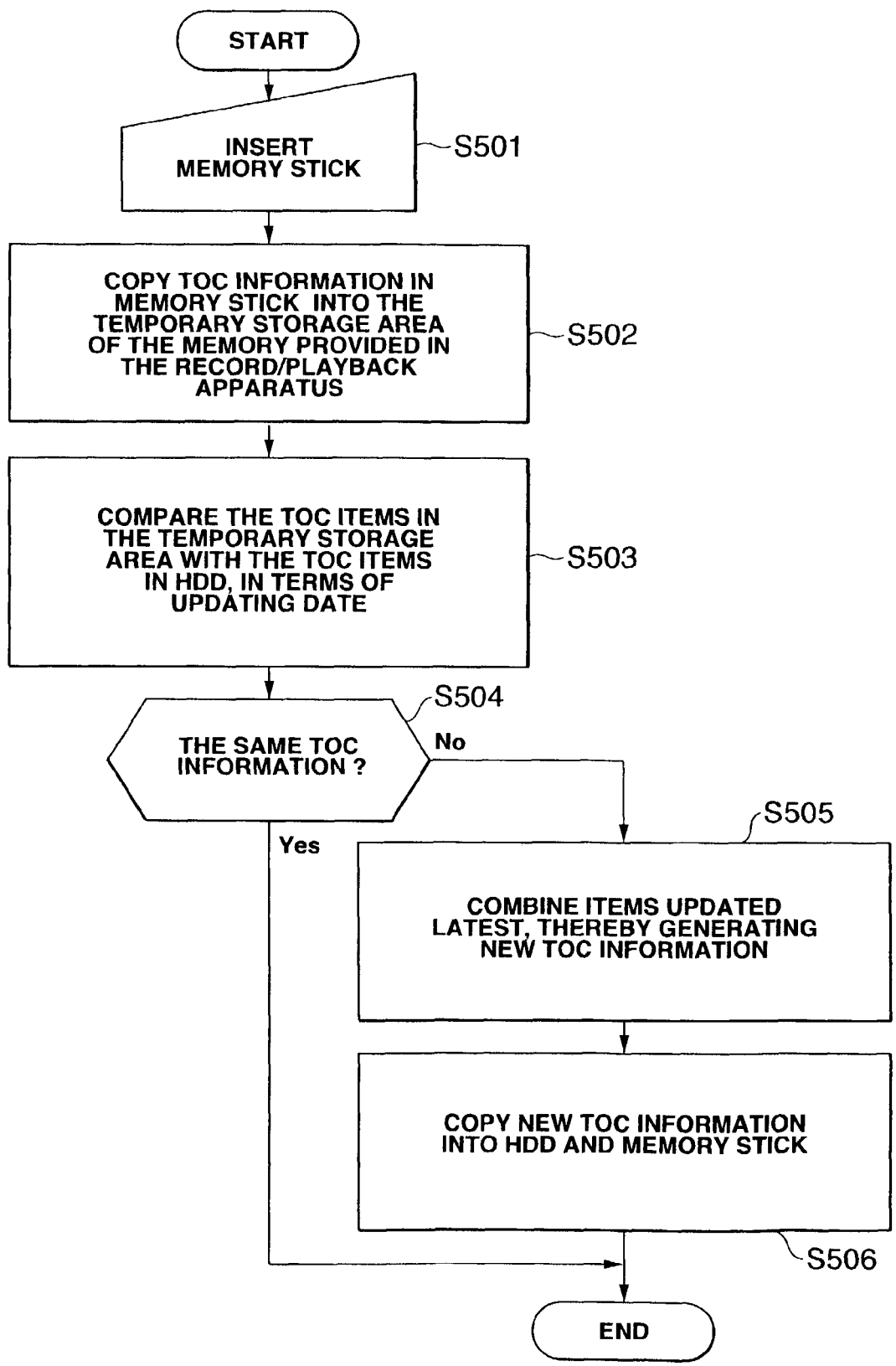
FIG. 6 is a flowchart explaining the process of managing the version data contained in the TOC information that has been modified to prevent the trouble explained with reference to FIG. 4.

FIG. 6 is a flowchart explaining this measure, i.e., a process of managing the version data about the TOC information 63.

As shown in FIG. 6, the user inserts the memory stick 73 into the memory stick slot 72 (Step 501). Then, the TOC information 63 written in the memory stick 73 is copied into the temporarily storage area of the RAM 52 provided in the record/playback apparatus 10 (Step 502). The dates when the TOC information items copied and held in the temporary storage area have been updated are compared with the date when the TOC information items stored in the hard disc drive 62 have been updated (Step 503). Next, the TOC information 63 held in the temporary storage area is compared with the TOC information 63 stored in the hard disc drive 62, in terms of their contents (Step 504). In Step 504, the TOC information items in the temporary storage area are compared with the corresponding TOC information items in the hard disc drive 62, in terms of their update dates. If the TOC information 63 that is held in the temporary storage area and the TOC information 63 that is stored in the hard disc drive 62 are identical in terms of contents, the process is terminated.

If the TOC information 63 held in the temporary storage area and the TOC information 63 stored in the hard disc drive 62 are different, the TOC information items that have been found to be latest in Step 503 are combined, thus generating new TOC information 63 that reflects the latest updating (Step S505). The new TOC information 63 thus generated is copied in both the hard disc drive 62 and the memory stick 73 (Step 506). As a result of this, the TOC information 63 hitherto held in the hard disc drive 62 and the TOC information 63 hitherto written in the memory stick 73 are changed to the latest TOC information 63.

In this case, the music data remains undeleted in the record/playback apparatus 10 even if the user operates the input devices to delete the music data. Instead, the data indicating the deletion of the music data is added to the TOC information 63. This prevents the trouble that a music data item no longer exists though the TOC information 63 contains the music data item when the TOC information 63 held in the memory stick 73 is edited to keep this music data recorded.

After the TOC information 63 in the hard disc drive 62 and the TOC information 63 in the memory stick 73 are found to be identical in the process explained with reference to FIG. 6, the music data is actually deleted in accordance with the TOC information 63.

Industrial Applicability

As has been described, the present invention uses an external editing apparatus to edit the additional information for managing the audio data recorded in the large-capacity recording apparatus, such as a hard disc drive, incorporated in an audio system. The use of the editing apparatus can greatly save labor in editing the additional information.

The invention claimed is:

1. A content playback apparatus for reproducing content data stored in the form of an electronic file, said apparatus comprising:
    a data-rewritable recording medium configured to store content data and management data for managing the content data, wherein said management data includes identification information and genre information of said content data;
    an external interface configured to supply the management data read from the recording medium to an external apparatus and receive from the external apparatus edited management data edited by the external apparatus; and
    a control section configured to rewrite and replace the management data stored in the recording medium by the edited management data received by the external interface from the external apparatus, wherein said edited management data manages the content data,
    wherein said external apparatus is operable to display said identification information of the content data in order of the genre based on the genre information, and to perform edits based on inputs to said displayed identification information, and
    wherein the external interface includes data-writing/reading device to respectively write and read data into and from a removable recording medium into and from which the external apparatus can write and read the management data, and
    wherein the content playback apparatus is operable (a) to edit the management data stored in the data-rewritable recording medium without use of the external apparatus only when the removable recording medium is inserted in the external interface such that the content playback apparatus is unable to edit the management data stored in the data-rewritable recording medium when the removable recording medium is not inserted in the external interface, and (b) to play the content data with the data-rewritable recording medium when the removable recording medium is not inserted in the external interface.

2. The content playback apparatus according to claim 1, wherein the data-rewritable recording medium is the one on and from which data can be written to and read from by magnetic means permanently incorporated in the content playback apparatus.

3. The content playback apparatus according to claim 1, wherein the data-rewritable recording medium stores the content data and the management data in separate files.

4. A method of managing content data in a content playback apparatus that reproduces content data stored in the form of an electronic file, said method comprising:
    a step of storing content data and management data for managing the contend data into a recording apparatus in which data can be rewritten, wherein said management data includes identification information and genre information of said content data;
    a step of reading the management data from the recording apparatus and supplying the management data to an external apparatus;
    a step of displaying said identification information of the content data in order of the genre based on the genre information of the content data;
    a step of editing the management data based on inputs to said displayed identification information in the external apparatus;

a step of transferring edited management data edited by the external apparatus; and a step of rewriting and replacing the management data stored in the recording apparatus by the edited management data edited by the external apparatus, thereby updating the management data, wherein the content playback apparatus includes data-writing/reading device to respectively write and read data into and from a removable recording medium into and from which the external apparatus can write and read the management data, and wherein the method further comprises enabling (a) the management data stored in the recording apparatus to be edited by the content playback apparatus without use of the external apparatus only when the removable recording medium is inserted in the content playback apparatus such that editing of the management data stored in the recording apparatus by the content playback apparatus is not permitted when the removable recording medium is not inserted in the content playback apparatus and (b) the content data to be played with the recording apparatus when the removable recording medium is not inserted in the content playback apparatus.

5. The method of managing content data according to claim 4, wherein the step of rewriting and replacing the management data includes:

a step of comparing a date of updating the management data stored in the recording apparatus with a date of editing the management data edited and combining items of the management data that are the latest, thereby to generate previously presented management data; and a step of rewriting and replacing the management data stored in the recording apparatus by the previously presented management data.

6. A method of managing content data in a playback apparatus that reads and reproduces content data from a first recording medium that stores the content data and management data for managing the content data, wherein said management data includes identification information and genre information of said content data, said method comprising:

a step of reading the management data from the first recording medium and outputting the management data to an external apparatus;

a step of displaying said identification information of the content data in order of the genre based on the genre information of the content data;

a step of editing the management data in the external apparatus based on inputs to said displayed identification information;

a step of transferring management data edited in the external apparatus; and a step of managing the content data by using the management data received from the external apparatus, instead of the management data stored in the first recording medium, wherein the playback apparatus includes data-writing/reading device to respectively write and read data into and from a removable recording medium into and from which the external apparatus can write and read the management data, and wherein the method further comprises enabling (a) the management data stored in the first recording medium to be edited by the playback apparatus without use of the external apparatus only when the removable recording medium is inserted in the playback apparatus such that editing of the management data stored in the first recording medium by the playback apparatus is not permitted when the removable recording medium is not inserted in the playback apparatus, and (b) playing the content data with the first recording medium when the removable recording medium is not inserted in the playback apparatus.

7. The content playback apparatus according to claim 1, wherein said control section compares the dates of updating of the management data and those of the edited management data and rewrites and replaces the management data with the edited management data if the dates of updating of the edited management data is later.

8. A system for managing content data stored in the form of an electronic file, the system comprising:

an external apparatus for editing management data for managing the content data; and a content playback apparatus for reproducing the content data, the apparatus including:

a data-rewritable recording medium configured to store the content data and the management data for managing the content data;

an external interface configured to supply the management data read from the recording medium to the external apparatus and receive from the external apparatus edited management data edited by the external apparatus; and a control section configured to rewrite and replace the management data stored in the recording medium by the edited management data received by the external interface from the external apparatus, wherein said edited management data manages said content data, wherein the content playback apparatus includes data-writing/reading device to respectively write and read data into and from a removable recording medium into and from which the external apparatus can write and read the management data, and wherein the content playback apparatus is operable (a) to edit the management data stored in the data-rewritable recording medium without use of the external apparatus only when the removable recording medium is inserted in the content playback apparatus such that editing of the management data stored in the data-rewritable recording medium by the content playback apparatus is not permitted when the removable recording medium is not inserted in the content playback apparatus, and (b) to play the content data with the data-rewritable recording medium when the removable recording medium is not inserted in the external interface.

9. The content playback apparatus according to claim 1, further comprising a display unit configured to display said identification information of the content data, wherein the size of said display unit is smaller than the size of the display unit of the external apparatus.

10. The method of managing content data according to claim 4, wherein the recording apparatus is the one on and from which data can be written to and read from the recording apparatus by magnetic means permanently incorporated in the content playback apparatus.

11. The method of managing content data according to claim 4, wherein the recording apparatus stores the content data and the management data in separate files.

12. The method of managing content data according to claim 4, wherein said step of rewriting and replacing the management data compares the dates of updating of the management data and those of the edited management data and rewrites and replaces the management data with the edited management data if the dates of updating of the edited management data is later.

13. The method of managing content data according to claim 4, wherein the step of displaying uses a display unit configured to display said identification information of the content data, wherein the size of said display unit is smaller than the size of a display unit of the external apparatus.

14. The method of managing content data according to claim 6, wherein the first recording medium is the one on and from which data can be written to and read from by magnetic means permanently incorporated in the playback apparatus.

15. The method of managing content data according to claim 6, wherein the first recording medium stores the content data and the management data in separate files.

16. The method of managing content data according to claim 6, wherein said step of rewriting and replacing the management data compares the dates of updating of the management data and those of the edited management data and rewrites and replaces the management data with the edited management data if the dates of updating of the edited management data is later.

17. The method of managing content data according to claim 6, wherein the step of displaying uses a display unit configured to display said identification information of the content data, wherein the size of said display unit is smaller than the size of a display unit of the external apparatus.

* * * * *